(12) United States Patent
Nambu et al.

(10) Patent No.: US 6,869,537 B1
(45) Date of Patent: Mar. 22, 2005

(54) METAL CHELATE-FORMING FIBER, PROCESS FOR PRODUCING THE SAME, METHOD OF TRAPPING METAL ION WITH THE FIBER, AND METAL CHELATE FIBER

(75) Inventors: Nobuyoshi Nambu, Yokkaichi (JP); Osamu Ito, Yokkaichi (JP); Takao Doi, Yokkaichi (JP)

(73) Assignees: Chubu Chelest Co., Ltd., Osaka (JP); Chelest Corporation, Osaka (JP)

( * ) Notice: Subject to any disclaimer, the term of this patent is extended or adjusted under 35 U.S.C. 154(b) by 0 days.

(21) Appl. No.: 09/979,632
(22) PCT Filed: May 22, 2000
(86) PCT No.: PCT/JP00/03245

§ 371 (c)(1),
(2), (4) Date: Feb. 6, 2002

(87) PCT Pub. No.: WO00/71805
PCT Pub. Date: Nov. 30, 2000

(30) Foreign Application Priority Data

May 25, 1999 (JP) .......................................... 11-145234

(51) Int. Cl.⁷ ................................................. C02F 1/42
(52) U.S. Cl. ....................... 210/683; 210/684; 210/685; 210/686; 210/687; 210/688; 210/912; 210/913; 210/914
(58) Field of Search ................................. 210/683–688, 210/912–914

(56) References Cited

U.S. PATENT DOCUMENTS 4,135,877 A    1/1979  Aikawa et al.
4,663,163 A    5/1987  Hou et al.
5,215,692 A    6/1993  Hörl et al.
5,556,708 A    9/1996  Hörl et al.
6,168,863 B1 *  1/2001  Nambu et al. ............... 428/364

FOREIGN PATENT DOCUMENTS

| JP | 54002498 A | * | 1/1979 | ............ C08F/4/00 |
| JP | 59015571 A | * | 1/1984 | .......... D06M/13/18 |
| JP | 63240902 A | * | 10/1988 | .......... B01D/13/00 |
| JP | 02187413 A | * | 7/1990 | ............ C08F/38/00 |
| JP | 07243314 A | * | 9/1995 | ............ F01M/9/10 |
| JP | 09248570 A | * | 9/1997 | ............. C02F/1/44 |
| WO | WO 92/805 A |   | 1/1992 |  |
| WO | WO 98/16680 A |   | 4/1998 |  |

OTHER PUBLICATIONS

Waly A. et al., Synthesis and Characterization of Cellulose Ion Exchanger; Pilot Scale and Utilization in Dye–Heavy Metal Removal, Paperchem, XP002191928.

* cited by examiner

Primary Examiner—Chester T Barry
(74) Attorney, Agent, or Firm—Smith Patent Office

(57) ABSTRACT

A fiber capable of forming a metal chelate and a process for producing the same are disclosed, wherein the fiber is characterized in that at least one metal chelate-forming compound selected from the group consisting of aminocarboxylic acid, aminocarboxylic acid, thiocarboxylic acid and phosphoric acid, which are reactive with a glycidyl group, is bonded to a molecule of a synthetic fiber through a crosslinkable compound having a reactive double bond and a glycidyl group in its molecule. The chelate-forming fiber is excellent in capturing harmful heavy metal ions and can be easily produced in a simple and safe way at a low cost.

18 Claims, 2 Drawing Sheets

METAL CHELATE-FORMING FIBER, PROCESS FOR PRODUCING THE SAME, METHOD OF TRAPPING METAL ION WITH THE FIBER, AND METAL CHELATE FIBER

TECHNICAL FIELD

The present invention relates to a novel metal chelate-forming fiber, a process for producing the same, a method of capturing metal ions with the use of the fiber, and a metal chelate fiber. The metal chelate-forming fiber is capable of selectively and efficiently adsorbing, for example, metal ions present in trace amounts in water, especially, copper, zinc, nickel, cobalt and other harmful heavy metal ions even in a low pH region and can be extensively and effectively used for, for example, the purification of industrial waste water, drinking water and oil. A metal chelate fiber in which the metal chelate-forming fiber and a metal are bonded by chelation can be effectively used, for example, as a variety of catalysts, odor-removing agent, deodorant, biocide, antimicrobial agent and microbicide, antistatic agent, electromagnetic shielding material, optical shielding material, colored clothing and ornament, fertilizer and metal rust inhibitor, taking advantage of an activity of the metal chelating with the fiber.

BACKGROUND ART

A variety of harmful heavy metal ions are contained in some industrial waste water and must be removed by waste water treatment as much as possible in view of the prevention of environmental pollution. Since many of such heavy metal ions can be effectively used, for example, as useful metals, it serves as a double purpose to separate, recover and use them effectively as secondary resources.

Ion exchange resins have been widely used for removing harmful heavy metal ions and for capturing useful metal ions contained in, for example, water before or after use. However, the ion exchange resins cannot always have sufficient effects of selectively adsorbing metal ions at low concentration.

Chelate-forming resins capable of forming a chelate with metal ions to thereby selectively capture these metal ions have excellent capability of selectively capturing metal ions, especially of capturing heavy metal ions, thus the chelate resins are used to remove or capture heavy metals in the field of water treatment.

However, since most of the chelate-forming resins are bead-like resins having a rigid three-dimensional crosslinked structure formed by action of a crosslinking agent such as divinylbenzene and are hydrophobic, a rate of diffusion of metal ions or regenerants into the resins is slow. Thus, treatment efficiency is insufficient. In addition, in the disposal type of the resins without being regenerated, since it is difficult to subject the used resins to the incinerating disposal, problems such as volume reduction of the used resins have been greatly pointed out.

As a possible solution to these problems of bead-like chelatable resins, a fibrous chelate-forming resin has been proposed (Japanese Patent No. 2,772,010). The fibrous chelate-forming resin has a large specific surface area, includes a metal chelate-forming functional group, where metal ions are adsorbed or desorbed, on its surface, and therefore has an improved adsorption and desorption capability.

However, the process for producing the fibrous chelate-forming resin, namely modification to impart metal chelating activity to the resin, Is complicated and requires a special process using, for example, ionizing radiation, and a number of disadvantages have been pointed out in terms of, for example, facilities, safety, and production cost.

DISCLOSURE OF THE INVENTION

The present invention has been accomplished under these circumstances, and a first object of the present invention is to provide a metal chelate-forming fiber which has satisfactory capability of capturing harmful heavy metal ions, moreover, can be produced at low cost, in a simple and safe manner. It is a second object of the invention to provide a process for easily, safely, and efficiently producing the metal chelate forming fiber.

A third object of the present invention is to provide a method of easily and efficiently capturing metal ions contained in trace amounts, for example, in an aqueous or oily liquid or in a gas such as an exhaust gas and the like by the use of the metal chelate forming fiber. Additionally, a fourth object of the present invention is to provide a metal chelate fiber which is making use of catalytic activities or antimicrobial activities of various metals by allowing the metals to be bonded by chelation to a surface of the metal chelate-forming fiber.

The present invention has been accomplished to achieve the above objects and provides the metal chelate-forming fiber. The subject matter of the inventive fiber is that a crosslinkable compound which has a reactive double bond and a glycidyl group in its molecule is introduced into a fiber molecule of a synthetic fiber consisting of a polycondensation type fiber or a polyaddition type fiber with a redox catalyst, and at least one metal chelate-forming compound selected from the group consisting of aminocarboxylic acid, thiocarboxylic acid and phosphoric acid which are reactive to an epoxy group is bonded to a fiber molecule through the crosslinkable compound.

As the crosslinkable compound, typically preferred are glycidyl methacrylate, glycidyl acrylate and allyl glycidyl ether. These compounds can be used individually or in combination of at least two of them, if it is required.

Preferred examples of the metal chelate-forming compounds are iminodiacetic acid, ethylenediaminediacetic acid, ethylenediaminetriacetic acid, thioglycolic acid, thiomalic acid and phosphoric acid. These compounds can also be used individually or in combination of at least two of them appropriately. Of these metal chelate-forming compounds, more preferable are iminodiacetic acid, ethylenediaminetriacetic acid and thioglycolic acid.

The polycondensation type and the polyaddition type synthetic fiber can be used, for example, in the form of a short fibrous powder, or in the form of a sheet, mat or nonwoven fabric.

The process of the present invention specifies a process for industrially efficiently producing the metal chelate-forming fiber and comprises subjecting a crosslinkable compound having a reactive double bond and a glycidyl group in its molecule to graft polymerization reaction with a fiber molecule of a synthetic fiber consisting of a polycondensation type fiber or a polyaddition type fiber with the use of a redox catalyst and allowing the resulting graft reaction product to be additional reacted with at least one metal chelate-forming compound selected from the group consisting of aminocarboxylic acid, thiocarboxylic acid and phosphoric acid which are reactive with an epoxy group.

Preferred crosslinkable compounds for use in this process are, for example, glycidyl methacrylate, glycidyl acrylate and allyl glycidyl ether. These compounds may be used individually, or in combination of at least two of them if it is necessary. Preferred examples of the metal chelate-forming compound include iminodiacetic acid, ethylenediaminediacetic acid, ethylenediaminetriacetic acid, thioglycolic acid, thiomalic acid and phosphoric acid. These compounds can also be used individually or in combination of at least two of them.

A polymerization catalyst for use in carrying out the production process of the invention is a redox catalyst. Especially, the following processes are employed. The synthetic fiber is previously treated with a persulfate, and is then applied with the divalent copper salt to thereby perform the graft polymerization, the synthetic fiber is previously treated with the divalent iron salt and then applied with the hydrogen peroxide and thiourea dioxide to thereby perform the graft polymerization, or the synthetic fiber is previously heated in a solvent and then is subject to the graft polymerization using a radical catalyst. The use of this procedure can allow the synthetic fiber to more efficiently react with the crosslinkable compound and can increase the resultant introduced amount of the metal chelate-forming compound to thereby impart a higher chelating activity to the fiber.

Additionally, a method of capturing metal ions according to the present invention comprises bringing the metal chelate-forming fiber into contact with an aqueous liquid, an oily liquid or a gas such as a exhaust gas each containing metal ions to thereby capture the metal ions by chelation from these substances.

Further, the metal chelate-forming fiber is bonded with a metal by chelation to obtain a metal chelate fiber. The resulting metal chelate fiber exhibits, for example, catalytic activities, antimicrobial activities depending on the type of the metal, and is also included within the scope of the present invention.

BEST MODE FOR CARRYING OUT THE INVENTION

Figure 1:
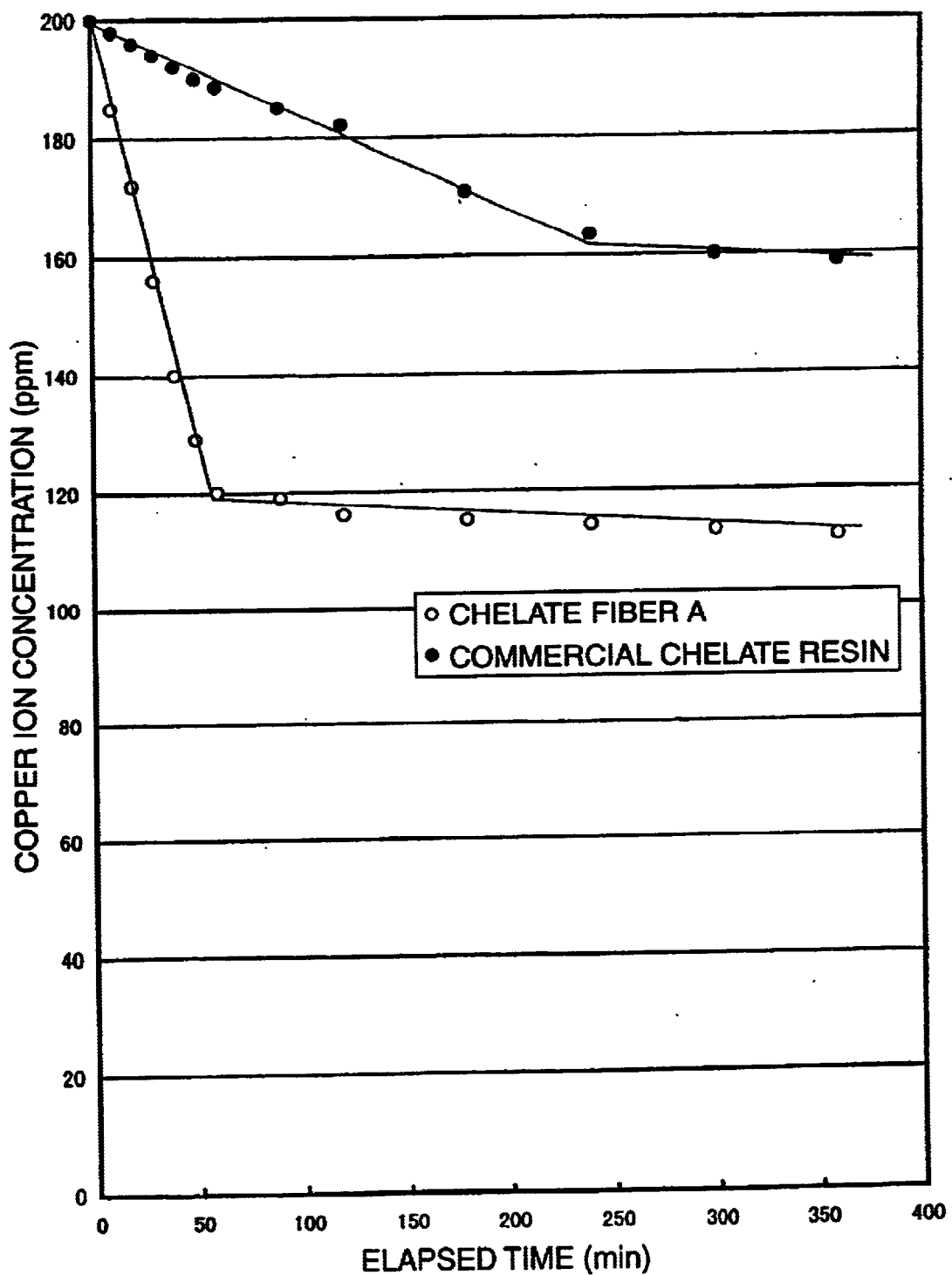
FIG. 1 is a graph showing a comparison of a capturing rate of metal ions between the metal chelate-forming fiber of the present invention and a commercial bead-like chelate-forming resin.

The metal chelate-forming fiber of the present invention comprises a polycondensation type or a polyaddition type synthetic fiber as a base fiber. Specifically, the synthetic fiber is a polycondensation type fiber, a polyaddition type fiber, or an additional polymerization type fiber. Since the synthetic fiber has a good water-resistance and oil-resistance, the synthetic fiber can be applied for an aqueous or oily solution to be treated, further, can be used for a purification treatment of various exhaust gases.

Additionally, the fiber molecule allows the crosslinkable compound to be easily introduced into the fiber molecule by reacting the crosslinkable compound having a double bond and a glycidyl group in its molecule in the presence of a redox catalyst. After the introduction of the crosslinkable compound, the fiber molecule is subjected to reacting with a metal cholate-forming compound which is reactive with a glycidyl group to thereby easily impart chelating capability to the fiber molecule. In this procedure, iminodiacetic acid, ethylenediaminediacetic acid, ethylenediaminetriacetic acid, thioglycolic acid, thiomalic acid or phosphoric acid are used as the preferable chelate-forming compound.

Consequently, the synthetic fiber has a multitude of metal chelate-forming functional groups introduced onto a surface of its fiber molecule. Nitrogen atoms, sulfur atoms, carboxyl groups or other moieties present in the chelate-forming functional groups satisfactorily exhibit the selective adsorption of copper, zinc, nickel, cobalt and other heavy metal ions. Additionally, since these metal chelate-forming functional groups are exposed at the surface while being grafted to the fiber molecule, the metal chelate-forming fiber satisfactorily exhibit the selective adsorption of metal ions by action of the chelate-forming functional group.

As the synthetic fiber constituting a base material of the metal chelate-forming fiber of the present invention, a polycondensation type fiber such as polyester, polyamide and the like; and a polyaddition type fiber such as polyurethane, polyurea and the like are selected because the active portion for the graft addition easily generates due to the withdrawal of hydrogen. The conventional synthetic fiber can be used without any treatment. Moreover, it is of course effective to use the conventional synthetic fiber which is treated with a peroxide, ozone, or other oxidizing agent, or into which the carboxyl group or the hydroxyl group are introduced by partial hydrolysis of an ester bond and an amide bond.

The base fiber has no special limitation on its shape, and may have the shape of monofilament or multifilament of long fibers. spun yarn of short fibers, woven or knitted fabric produced by weaving or knitting them, or nonwoven fabric. It is also effective to use mixed spinning fibers, composite fibers or woven or knitted fabrics which are produced from two or more types of fibers.

To increase the efficiency of contacting with a fluid to be treated, the base fiber is effectively used as a material in the form of a short fibrous powder or a filter.

The short fibrous powder for use herein has a preferable shape of from 0.01 to 5 mm in length, more preferably from 0.03 to 3 mm in length; of from about 1 to about 50 $\mu$m in a monofilament diameter, more preferably from 5 to 30 $\mu$m in a monofilament diameter; and of from about 1 to about 600 in an aspect ratio, more preferably from about 1 to about 100 in an aspect ratio.

The powdery material in the form of the short fiber can be used in such a conventional filtration treatment where the metal chelate-forming fiber in the form of the short fibrous powder is added to and stirred with an aqueous or oily liquid containing the metal ion.

In some cases, the metal chelate-forming fiber in the form of a short fibrous powder is charged into a column and the like and the fluid to be treated is allowed to pass through them in order to obtain the same effect for capturing metal ions. Alternatively, the metal chelate-forming fiber in the form of a short fibrous powder is subjected to a processing such as molding after introducing the metal chelate-forming functional group in the above manner to easily obtain a filter which has a chelate-capturing ability.

Additionally, when the short fibrous powdery chelate-capturing material obtained in the above manner is allowed to capture copper, silver, zinc or another metal having microbicidal activities, the resulting metal chelate fiber can impart odor-removing, deodorizing, boiocidal, antimicrobial, microbicide activity to, for example, a resin by kneading the same into the resin. Likewise, a metal chelate fiber capturing a metal ion having oxidation-reduction activity is also useful as a catalyst for various reactions.

The material in the form of a filter does not have a noticeably special structure and can be used in all known structures for the filter. Such structures include a structure obtained by forming into a mat having a single- or multi-layer structure made of a woven/knitted or nonwoven fabric which has any space between fibers depending on the application, and mounting the mat onto a suitable supporting substrate; a structure obtained by winding a string of a fiber around the outer periphery of a liquid-permeable cylindrical substrate in a twill pattern several times; a structure obtained by folding a woven/knitted fabric or nonwoven sheet made of the aforementioned fiber in a pleated pattern and mounting the resultant to a supporting member; and a bag filter structure obtained by forming a woven or knitted fabric made by the aforementioned fiber into a bag.

When these filter-shaped materials are used, the crosslinkable compound is grafted to the filter-shaped fiber material, and the glycidyl group of the crosslinkable compound grafted to the fiber molecule is subjected to addition reaction with a metal chelate-forming compound to thereby introduce metal chelate-forming functional groups into the fiber, and the resulting fiber is processed into a filter as above. In addition, the fiber material is processed into a filter, and is assembled into a filter device, and the fiber-filter assembled in the device is brought into contact with, and subjected to graft reaction with, a treatment liquid containing the crosslinkable compound and is then brought into contact with a metal chelate-forming compound to thereby subsequently introduce metal chelate-forming functional groups into the fiber-filter.

In this manner, the introduction of metal chelate-forming functional groups into the filter-shaped fiber material can yield the filter which is capable of both capturing metal ions by action of chelation and capturing insoluble impurities. Accordingly, by using the fiber material whose fiber density is adjusted so as to have an appropriate mesh size in accordance with the sizes of insoluble impurities contained in a liquid or a gas to be treated and the liquid or the gas to be treated, metal ions contained in the liquid or the gas to be treated are captured by the chelate-forming functional group when the liquid or the gas pass through the filter and, concurrently insoluble impurities are prevented from passing through the filter by action of the mesh of the filter. Thus, the metal ions and insoluble impurities can be concurrently removed from the liquid or the gas.

In this case, the size of the fibers, woven or knitted density, number of lamination layer or density of lamination layer of the chelate-forming fiber used are adjusted, or the density of winding, thickness of wound layers or tension of winding are adjusted when the filter is obtained by winding a string of the chelate-forming fiber several times so that the filter can have the optional spaces between the fibers. Thus, the filter having a necessary capability of purification can be obtained by controlling the spaces between the fibers depending on the particle sizes of insoluble impurities contained in the fluid to be treated.

A compound having a reactive double bond and a glycidyl group in its molecule is used as the crosslinkable compound to fix the metal chelate-forming functional groups to the base fiber in the production of the metal chelate-forming fiber of the present invention. The crosslinkable compound is brought into contact with the base fiber in the presence of a redox polymerization catalyst as mentioned later to thereby allow the reactive double bond to react with the fiber molecule, and a group having a glycidyl group as a reactive functional group is grafted and added in the form of a pendant to the fiber molecule.

And then, the resulting graft-adduct is allowed to react with a metal chelate-forming compound having a functional group reactive with a glycidyl group, and the reactive functional group reacts with the glycidyl group of the graft-added crosslinkable compound to thereby introduce metal chelate-forming functional groups into the fiber molecule.

Any of compounds can be used as the crosslinkable compound as long as it has both the reactive double bond and the glycidyl group in a its molecule to ensure the reaction with the metal chelate-forming compound in addition to the graft-additional reaction with the fiber molecule. Among them, typically preferred compounds are glycidyl methacrylate, glycidyl acrylate and allyl glycidyl ether, since they can be more efficiently grafted and added to the synthetic base fiber and can efficiently perform the subsequent introduction reaction of the metal chelate-forming compound. Of these compounds, the most preferred compound is glycidyl methacrylate in view of, for example, its easiness of introduction into the fiber molecule or its availability.

As the metal chelate-forming compound, aminocarboxylic acid, thiocarboxylic acid and phosphoric acid each being reactive with a glycidyl group are selected. These compounds are highly reactive with a glycidyl group and react, in an almost equimolar amount, with the glycidyl group of the crosslinkable compound introduced into the fiber molecule. Additionally, the compounds are highly capable of chelating with metal ions, and the use of the compounds can efficiently introduce the metal chelate-forming functional group into the fiber molecule with a high reaction rate.

Among these metal chelate-forming compounds, preferred compounds are iminodiacetic acid, ethylenediaminediacetic acid, ethylenediaminetriacetic acid, thioglycolic acid, thiomalic acid and phosphoric acid, in comprehensive view of reaction efficiency, metal chelate-capturing capability, availability of a material, cost and other factors. Among them, iminodiacetic acid, ethylenediaminetriacetic acid and thioglycolic acid are more preferable.

Further, the process of the present invention for producing the metal chelate-forming fiber is evaluated as a process that can efficiently and easily introduce the metal chelate-forming compound into the molecule of the synthetic fiber through the crosslinkable compound as mentioned above. As the process of the invention, a process in which the crosslinkable compound is subjected to the graft polymerization reaction with the fiber molecule using a redox catalyst and the resulting reaction product is subjected to the addition reaction with the chelate-forming compound is employed.

As the polymerization catalysts, the redox catalyst which include hydrogen peroxide, persulfate each serving as an oxidizing agent; and divalent iron salts, divalent copper salts, thiourea dioxide, chromium ion, sulfites, dimethylaniline, hydroxylamine and hydrazine each serving as a reducing agent can be used in addition to the radical polymerization catalyst such as benzoyl peroxide, cumene hydroperoxide, t-butyl peroxide. A combination of a divalent copper salt and a persulfate, or a combination of hydrogen peroxide, a divalent iron salt and thiourea dioxide is the most preferred combination in order to subject the crosslinkable compound efficiently to the graft reaction with the fiber molecule.

A specific process for enhancing the efficiency of the graft reaction to the molecule of the synthetic fiber is as follows:

① A process where the synthetic fiber is previously treated with the divalent iron salt and then applied with hydrogen peroxide and thiourea dioxide.

② A process where the synthetic fiber is previously treated with the persulfate and then applied with the divalent copper salt.

③ A process where the synthetic fiber is previously heated in a solvent and then applied with the radical polymerization catalyst.

The use of theses procedures can yield a high graft-reaction rate by a short-time treatment even in the relatively mild conditions, thus these procedures are preferable.

An example of the graft polymerization reaction of the crosslinkable compound with a polyamide fiber by the use of the combination of persulfate and a divalent iron salt is illustrated as follows:

~CO—NH~ + $S_2O_8^{2-}$ + $Cu^{2+}$
Polyamide fiber
→ ~CO—Ṅ~ + $Cu^+$ + $HSO_4^-$ + $•SO_4^-$   (Radical formation in the Polyamide fiber)
$Cu^+$ + $•SO_4^-$ → $Cu^{2+}$ + $SO_4^{2-}$   (Oxidation of Cu ion)
~CO—Ṅ~ + M → ~CO—N—M•   (Initiation of the graft
Monomer   polymerization)
~CO—N—M• + nM → ~CO—N—M•$_{n+1}$   (Propagation of the graft polymerization)

An example of the specific reaction of introducing the metal chelate-forming compound into the fiber molecule into which the crosslinkable compound is introduced via the graft reaction is illustrated as follows:

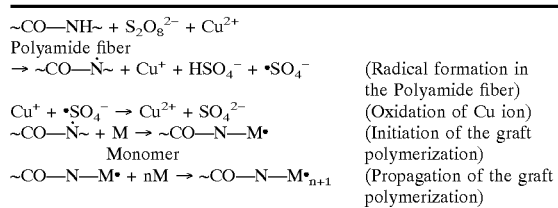

iminodiacetic acid

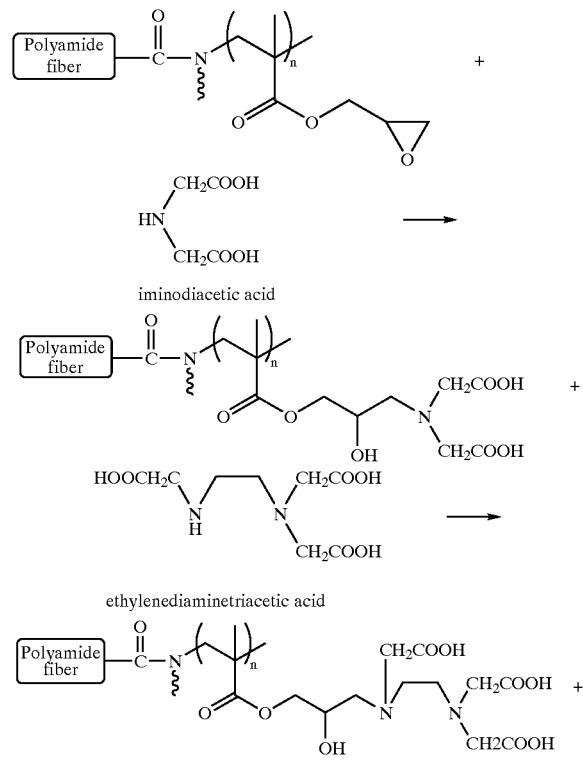

ethylenediaminetriacetic acid

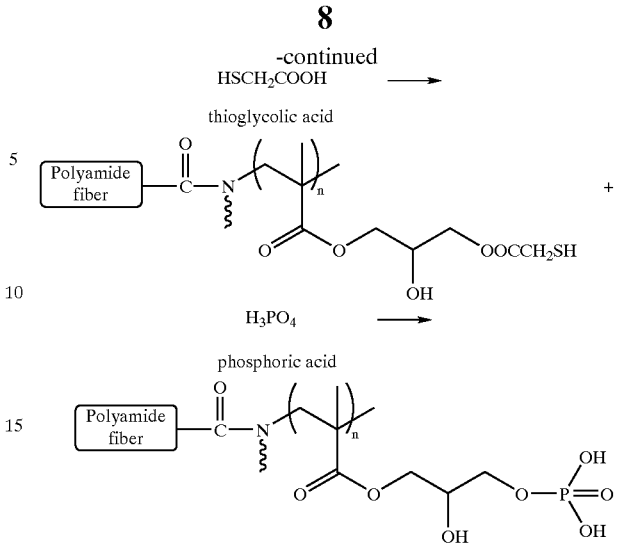

A reaction procedure for introducing the metal chelate-forming functional group into the molecule of the synthetic fiber using the crosslinkable compound is not specifically limited. A preferred procedure is illustrated as follows.

Specifically, in the preferred process, the synthetic fiber is immersed in an aqueous solution of a persulfate at the room temperature for from about 1 to about 60 minutes, subsequently, rinsed, and then is immersed in an aqueous solution containing the divalent copper salt and the crosslinkable compound (where necessary, with a homogeneous-reaction accelerator such as an emulsifying agent) and is allowed to react at 40° C. to 100° C. for from about 10 minutes to about 5 hours.

This procedure can allow the crosslinkable compound to efficiently graft-react with an amide group or an ester group in the fiber molecule to thereby efficiently introduce a glycidyl group which can easily react with the metal chelate-forming compound into the fiber molecule.

Next, the fiber into which the glycidyl group are introduced by the above reaction is allowed to react with the metal chelate-forming compound in a polar solvent such as water, N,N-dimethylformamide or dimethyl sulfoxide and, where necessary using a reaction solvent, at 50° C. to 100° C. for from 10 minutes to several ten hours. By this procedure, an amino group or an acid group in the metal chelate-forming compound reacts with the glycidyl group to thereby introduce the metal chelate-forming functional group into the fiber molecule.

The introduced amount of the metal chelate-forming compound with respect to the synthetic fiber can be optionally controlled by changing the amount of the crosslinkable compound for use in the introduction reaction, the amount of the metal chelate-forming compound or the reaction conditions, in view of the amount of the reactive functional group in the fiber molecule. To impart the sufficient capability of capturing metal ions to the fiber, the amount of the metal chelate-forming compound is preferably controlled such that a substitution rate calculated according to the following equation is equal to or more than about 10% by mass, more preferably equal to or more than about 20% by mass:

Substitution rate (% by mass)={[(Mass of the fiber after introduction of substituent)−(Mass of the fiber before introduction of substituent)]/(Mass of the fiber before introduction of substituent)}×100

(wherein the term "substituent" means all the substituents derived and introduced from the crosslinkable compound and the metal chelate-forming compound.)

The higher the substitution rate is, the more preferable it is to increase the capability of capturing metal ions, thus an upper limit of the substitution rate is not especially specified. However, an excessively high substitution rate tends to invite a higher crystallinity of the fiber where the substituent is introduced to thereby weaken the fiber, and tends to invite an increased pressure loss when the fiber is used, for example, as a filter medium or filter for capturing metal ions. Consequently, in comprehensive view of, for example, practical utility and of cost performance as a metal ion capturing material, the substitution rate is preferably not more than about 200% by mass, more preferably not more than 100% by mass. However, the metal ion capturing capability can be increased by employing a high level substitution rate of from about 150% to about 200% by mass depending on some types or shapes of the synthetic fiber, some types of the crosslinkable compound or the chelate-forming compound, or some applications.

The above-obtained metal chelate-forming fiber can be obtained in any form such as of a monofilament, multifilament, spun yarn, nonwoven fabric, fibrous woven or knitted fabric, powder or filter depending on the properties of the base fiber used as mentioned above. Since, in all cases, substantially all the metal chelate-forming functional groups introduced into a surface of the thin fiber molecule can effectively exhibit the capability of capturing he metal ions, and the resulting metal chelate-forming fiber can very satisfactorily exhibit the capability of capturing the metal ions.

Additionally, since this fiber is excellent in the selective adsorption of metal ions, this fiber can capture a target metal selectively by changing pH appropriately and other conditions of a fluid to be treated.

Therefore, this fiber can efficiently capture and remove a metal ton component contained in water, oil or an exhaust gas to be treated or can selectively capture a specific metal ion by bringing the fiber into contact with the liquid or the gas containing metal tons and, more specifically, by laminating the fiber to an optional thickness, or filling a column with the fiber and allowing the liquid or the gas to be treated to pass through the fiber.

In addition, when the fiber which captured the metal ions in the above manner is treated with an aqueous solution of a strong acid such as hydrochloric acid or sulfuric acid, the metal ions captured by forming chelation can be easily desorbed. By using this property, a metal component can be recovered as a useful component from a regenerated liquid.

Furthermore, the metal chelate-forming fiber of the invention can also be used for a metal chelate fiber. The metal chelate fiber comprises a metal which has a specific activity and captured by the metal chelate-forming fiber. The metal chelate fiber utilizes the specific activity of the metal and, for example, can be effectively used in the following various configurations:

① A metal having catalytic activity such as iron, titanium and the like is chelate-captured, and the resulting metal chelate fiber is used as a redox reagent (e.g., a catalyst for the removal of NOx or SOx);

② An antimicrobial metal such as copper, nickel, silver, or cobalt is captured by a base fiber in the form of a sheet or mat, and the resulting fiber is used as an antimicrobial or miorobicidal sheet or mat (e.g., a sole insert for shoes, bedclothes for medical application, a toilet cover or toilet base mat, or a hand towel), or the resulting fiber is processed into a filter and is used as a cleaning filter for use in, for example, an air conditioning equipment;

③ An antimicrobial or microbicidal metal is chelate-captured by a powdery fiber, and the resulting fiber is kneaded into, for example, a resin to prepare and use an antimicrobial or microbicidal plastic;

④ Zinc, titanium or the like is chelate-captured to obtain an odor-removing, deodorizing, or biocidial fiber, alternatively, the resultant fiber is kneaded into, for example, a resin to prepare and use an odor-removing, deodorizing, or biocidial plastic.

⑤ In a cleaning filter for an exhaust gas containing, for example, harmful nitrogen oxides (e.g., an exhaust gas from an underground parking zone or a tunnel on the highway), a metal having oxidative catalytic activity such as titanium or iron is attached by chelation to the fiber, and the resulting fiber is used as a metal chelate fibrous catalyst for rendering the nitrogen oxides harmless:

⑥ Copper or nickel, for example, is chelate-captured, and the resulting fiber is used as an electromagnetic shielding material for absorbing harmful electromagnetic waves;

⑦ A colored metal ion such as of copper, cobalt, nickel or iron is chelate-captured by the fiber, and the resulting fiber is used, for example, as a shading material, a colored cloth or ornaments; and ⑧ A metal essential for plants such as calcium, magnesium, manganese, iron, copper or zinc is chelate-captured by the fiber in a trace amount, and the resulting fiber is used as a fertilizer.

EXAMPLES

The present invention will be illustrated with reference to several examples below, which are not intended to limit the scope of the invention. Modifications and variations can be made without departing from the purpose described hereinabove and hereinafter and all such modifications and variations are also included in the technical scope of the present invention. In addition. "%" described hereinafter means "mass %".

Example 1

A 5 g of potassium peroxodisulfate was dissolved in 250 ml of distilled water. 2.5 g of 6-nylon cloth was immersed in the resulting solution at 20° C. for 30 minutes and was centrifugally dehydrated, and then added into the solution which is prepared by dissolving 1.5 g of glycidyl methacrylate and 0.5 g of copper sulfate 5 hydrates into 250 ml of distilled water, and treated with the solution at 80° C. for 30 minutes. Next, the treated nylon cloth was rinsed with distilled water, was centrifugally dehydrated and was dried at 60° C. for 16 hours to thereby obtain 3.5 g of nylon cloth having grafted glycidyl methacrylate.

Next, 20 g of iminodiacetic acid was added into 100 g of distilled water, and the resulting solution was adjusted to pH 10 with a 50% aqueous sodium hydroxide solution. The above-prepared grafted nylon cloth was immersed into and treated with this solution at 90° C. for 2 hours. Subsequently, the treated nylon cloth was sufficiently rinsed with distilled water, discharged from the distilled water, was immersed in 100 ml of a 5% sulfuric acid at 20° C. for 30 minutes, was sufficiently rinsed with water, was centrifugally dehydrated and was dried at 50° C. for 16 hours to thereby obtain 4.5 g (substitution rate: 80% by mass) of a metal chelate-forming fiber (chelate fiber A).

After 1 g of the obtained chelate fiber A was added to and stirred with 1 liter of a 5 mmol/liter aqueous copper sulfate solution at 20° C. for 20 hours, copper capturing capability was evaluated by determining the amount of copper ions remained in the solution. It was found that the chelate fiber A was capable of capturing 1.5 mmol of copper per gram of the chelate fiber A.

In place of the chelate fiber A, the copper capturing capability was determined separately in the same way except using a commercially available bead-like styrene-iminodiacetic acid chelate-forming resin (produced by Mitsubishi Chemical Corporation under the trade name of "DIAION CR11") as a comparison. As a result, it was confirmed that the chelate-forming resin was capable of capturing 0.7 mmol of copper per gram of the chelate-forming resin.

(Copper Ion Adsorption Rate Test)

A copper ion adsorption rate of the chelate fiber A was confirmed. 1 g of the chelate fiber A was added to 1 liter of an aqueous copper sulfate solution having a copper ion concentration of 200 ppm, and a change with time in copper ion concentration of the resulting solution was determined.

The results were as shown in FIG. 1. It took about 4 hours for the captured amount of copper ions to become saturated when the commercially available bead-like chelate resin was used. On the other hand, it took about 1 hour for the captured amount of copper ions to become saturated when the chelate fiber A of the invention was used, indicating that the chelate fiber A of the present invention had an adsorption capturing rate of about four times greater than the commercially available chelate resin.

(Break Through Curve Measurement Test)

1 g of the chelate fiber A was charged into a glass column of 5 mm in diameter. An aqueous copper sulfate solution having a copper ion concentration of 20 ppm was allowed to pass through the column at a flow rate of $SV=100\ hr^{-1}$, and a concentration of the copper ion in an effluent was measured to thereby determine a break through curve.

Figure 2:
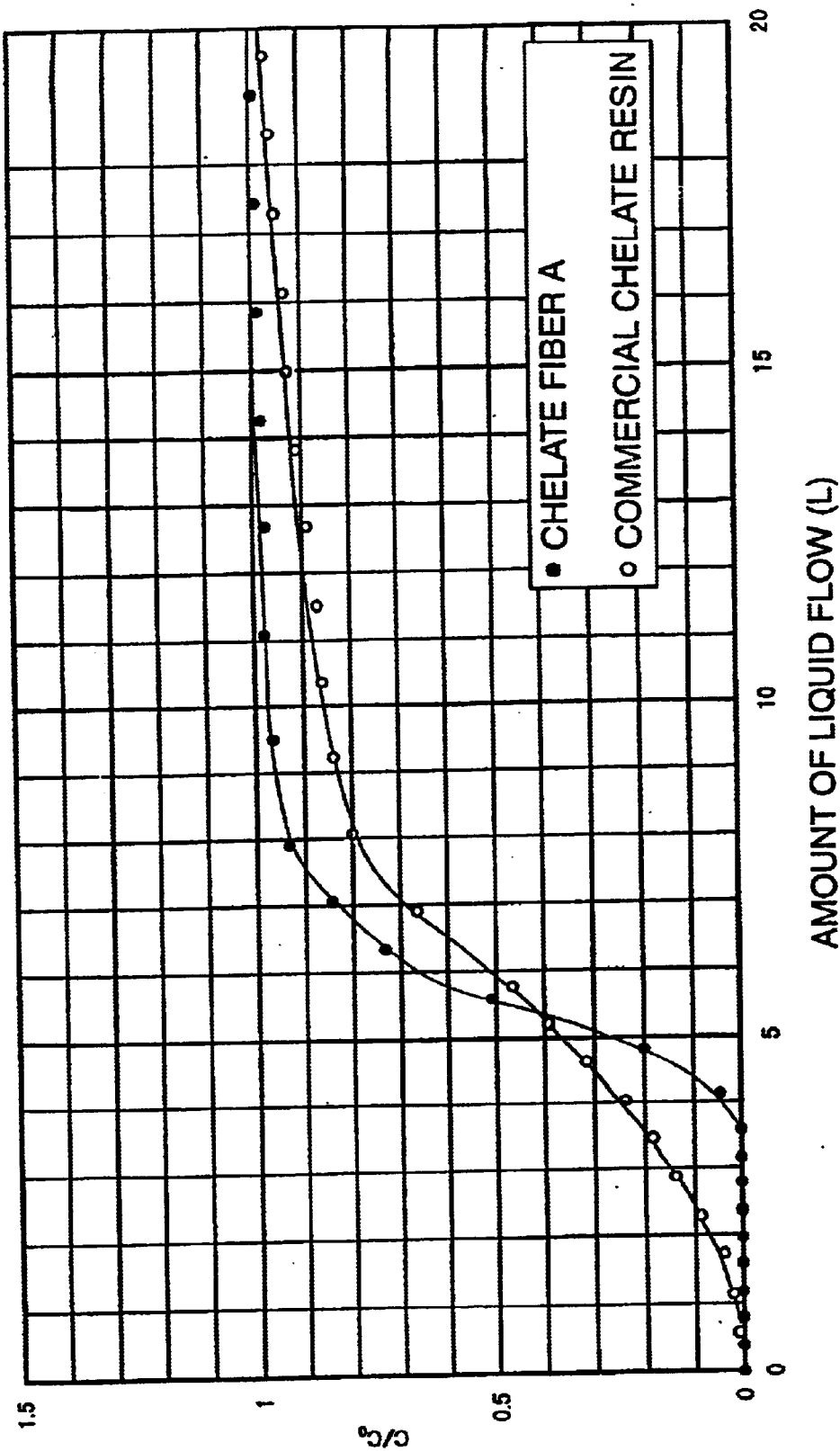
FIG. 2 is a graph showing a break through curve of a metal ions where the metal chelate-forming fiber of the present invention and the commercial bead-like chelate-forming resin was used.

The results were as shown in FIG. 2. The copper ion run out before it was sufficiently captured when the commercially available chelate resin was used. On the other hand, the chelate fiber A of the invention could nearly fully capture the metal before the capturing capability of metal of the chelate fiber became saturated. These results also indicated that the chelate fiber of the invention is capable of excellently capturing metal ions.

Example 2

A commercially available cartridge filter (produced by Rokitechno under the trade name of "micro-silia filter cartridge 250L-NS-1", nominal pore size: 1 $\mu$m), which was produced by winding a nylon spun yarn around a polypropylene core in a twill pattern, was mounted to a polypropylene housing (produced by Advantec Toyo Kaisha, Ltd. under the trade name of "1PP-1-FS-000"). Separately, 200 g of potassium peroxiodisulfate was dissolved in 10 liters of distilled water, and the resulting solution was circulated through the filter at a flow rate of 15 liter/minute at 20° C. for 15 minutes using a circulating pump, was drained, and the filter was cleaned by circulating 5 liters of distilled water in the same manner.

Next, 60 g of glycidyl methacrylate and 10 g of copper sulfate 5 hydrates were dissolved into 8 liters of distilled water. The resulting solution was circulated through the filter in the same manner at 8° C. for 2 hours to thereby graft glycidyl methacrylate to the molecule of the nylon spun yarn, and then the resulting reaction mixture was drained, and the cartridge filter was cleaned by circulating 3 liters of distilled water.

Next, 1 kg of iminodiacetic acid was added to 4 liters of distilled water, the resulting solution was adjusted to pH 10 with a 50% aqueous sodium hydroxide solution, the resulting solution was circulated through the filter containing the grafted glycidyl methacrylate at 80° C. for 2 hours, drainage and cleaning operations were repeated, 5 liters of a 5% sulfuric acid was circulated through the filter, and circulation and drainage operations were repeated using distilled water until washings became neutral to thereby obtain a metal chelate-forming filter (chelate fiber B).

This metal chelate-forming filter was mounted onto the polypropylene housing. Separately, copper sulfate was dissolved in distilled water to obtain 10 liters of solution with a copper ion concentration of 10 ppm, and 2.0 g of a fine silicon dioxide powder having a mean particle size of 10 $\mu$m was dispersed in this solution as an insoluble impurity to thereby obtain a test solution. The test solution was circulated through the above-prepared filter at a flow rate of 15 liters/minute at 25° C. for 1 hour.

Subsequently, a copper ion concentration of the test solution was determined. It was confirmed that the copper ion concentration was decreased less than or equal to 1 ppm. A 1 liter of the test solution was passed through a membrane filter having a pore size of 0.1 $\mu$m, and the amount of remained silicon dioxide was measured to determine the removing ratio of silicon dioxide. It was found that the removing ratio of silicon dioxide was 98.2%, indicating that the filter was capable of concurrently removing metal ions and insoluble impurities.

Example 3

The chelate-forming fiber was prepared in the same way of Example 1 except that 200 g of a 30% aqueous trisodium ethylenediaminetriacetate was used instead of the aqueous iminodiacetic acid solution, to thereby obtain 4.7 g (substitution rate: 88% by mass) of a metal chelate-forming fiber (chelate fiber C). The obtained chelate fiber C was subjected to the adsorption test in the same manner as Example 1. It was confirmed that the chelate fiber C was capable of capturing 1.0 mmol of copper per gram of the chelate fiber C.

Example 4

A nylon cloth onto which glycidyl methacrylate was grafted was obtained in the same manner as Example 1, and 3.5 g of this nylon cloth was immersed in 200 ml of thioglycolic acid, was heated at 80° C. for 3 hours, was rinsed with distilled water until washings became neutral and was then dried at 40° C. for 16 hours to thereby obtain 4.0 g (substitution rate: 60% by mass) of a metal chelate-forming fiber (chelate fiber D). The obtained chelate fiber D was subjected to the adsorption test in the same manner as Example 1. It was confirmed that the chelate fiber D was capable of capturing 1.3 mmol of copper per gram of the chelate fiber D.

Example 5

2.0 g of polyester cloth was added into 50 g of benzyl alcohol, heated at 150° C. for 1 hour, and then rinsed with methanol and distilled water. The resulting polyester cloth was added into the solution where 80 g of dimethylformamide, 20 ml of distilled water, 10.0 g of glycidyl methacrylate, 0.2 g of benzyl peroxide, and 0.2 g of dimethylaniline, and treated with the solution at 60° C. for 6 hours under introducing nitrogen. The treated cloth was rinsed with acetone and distilled water, and then centrifugally dehydrated and dried at 60° C. for 16 hours to thereby obtain 3.0 g of a polyester cloth onto which the glycidyl methacrylate was grafted.

Next, 20 g of iminodiacetic acid was added to 100 g of distilled water, the resulting solution was adjusted to pH 10 with a 50% aqueous sodium hydroxide solution. In this solution, the above-prepared grafted polyester cloth was imersed at 90° C. for 2 hours. Subsequently, the treated cloth was sufficiently rinsed with distilled water, was dehydrated, was immersed in 100 ml of a 5% sulfuric acid at 20° C. for 30 minutes, was sufficiently rinsed with water, was centrifugally dehydrated and was dried at 50° C. for 16 hours to thereby obtain 3.8 g (substitution rate: 90% by mass) of a metal chelate-forming fiber (chelate fiber S).

After 1 g of the obtained chelate fiber E was added to, and stirred with 1 liter of a 5 mmol/liter aqueous copper sulfate solution at 20° C. for 20 hours, copper capturing capability was evaluated by determining the amount of copper ions remained in the solution. It was found that the chelate fiber E was capable of capturing 1.4 mmol of copper per gram of the chelate fiber E.

Industrial Applicability

The metal chelate-forming fiber of the invention is configured as above, has a high capacity of capturing metal ions, exhibits a markedly satisfactory capturing rate, can very efficiently capture and remove metal ions from water before or after use, oils or gasses (including, for example, exhaust gases) and can very efficiently clean these substances, as compared with conventional ion exchange resins and chelate resins.

Additionally, when the metal chelate-forming fiber of the invention captures a metal ion, it can easily desorb the metal ion by a treatment with an aqueous solution of an acid such as a mineral acid or an organic acid. Consequently, the metal chelate-forming fiber can be easily regenerated, reused and can also be used for concentrating and obtaining a metal component.

The use of a powdery fiber as a base fiber allows the resulting fiber to concurrently have capability of removing metal ions and performance of a filter aid. Additionally, the use of a fiber material in the form of a filter allows the resulting filter to have purification activity including both capability of capturing metal ions and capability of removing insoluble impurities.

Additionally, when the process of the present invention is employed, a high performance fiber capable of capturing metal ions can be safely and easily obtained by such a simple manner as heating treatment in water or another conventional solvent without a special apparatus or treatment such as ionizing radiation.

Furthermore, when a metal ion to be chelate-captured is intentionally selected, characteristics of the metal itself such as catalytic, odor-removing, deodorizing, biocidal, antimicrobial, microbicidal, and antistatic activities can be imparted to the fiber as a metal chelate fiber. The resulting metal chelate fiber can be extensively and effectively used, for example, as a filter-shaped catalyst for exhaust gas treatment, a sheet material for odor-removing, deodorizing, biocidal, antimicrobial, microbicidal or antistatic use or a filter material for an air conditioning system.

What is claimed is:

1. A method of capturing a metal ion, comprising the steps of:
   providing a metal chelate-forming fiber, and
   bringing the metal chelate-forming fiber into contact with a liquid containing metal ions to capture the metal ions from the liquid, wherein the metal chelate-forming fiber comprises:
      a synthetic fiber selected from the group consisting of a polycondensation fiber or a polyaddition fiber, and
      at least one metal chelate-forming compound selected from an epoxy reactive group consisting of an aminocarboxylic acid, a thiocarboxylic acid and a phosphoric acid, bonded to the synthetic fiber via a crosslinkable compound,
   wherein the crosslinkable compound is grafted to the fiber by graft polymerizing a crosslinkable compound having a reactive double bond and a glycidyl group to the synthetic fiber in the presence of a redox catalyst.

2. The method according to claim 1, wherein the liquid is an aqueous liquid.

3. The method according to claim 1, wherein the liquid is oil.

4. A method of capturing a metal ion, comprising the steps of:
   providing a metal chelate-forming fiber; and
   bringing the metal chelate-forming fiber into contact with a gas containing metal ions to thereby capture the metal ions from the gas, wherein the metal chelate-forming fiber comprises:
      a synthetic fiber selected from the group consisting of a polycondensation fiber or a polyaddition fiber, and
      at least one metal chelate-forming compound selected from an epoxy reactive group consisting of an aminocarboxylic acid, a thiocarboxylic acid and a phosphoric acid, bonded to the fiber via a crosslinkable compound,
   wherein the crosslinkable compound is grafted to the fiber by graft polymerizing a crosslinkable compound having a reactive double bond and a glycidyl group to the synthetic fiber in the presence of a redox catalyst.

5. A metal chelate-forming fiber comprising
   a synthetic fiber selected from the group consisting of a polycondensation fiber or a polyaddition fiber, and
   at least one metal chelate-forming compound selected from an epoxy reactive group consisting of an aminocarboxylic acid, a thiocarboxylic acid and a phosphoric acid, bonded to the synthetic fiber via a crosslinkable compound,
   wherein the crosslinkable compound is grafted to the synthetic fiber by graft polymerizing a crosslinkable compound having a reactive double bond and a glycidyl group to the synthetic fiber in the presence of a redox catalyst.

6. The metal chelate-forming fiber according to claim 5, wherein the crosslinkable compound comprises a compound selected from the group consisting of glycidyl methacrylate, glycidyl acrylate and allyl glycidyl ether.

7. The metal chelate-forming fiber according to claim 5, wherein the metal chelate-forming compound comprises a compound selected from the group consisting of iminodiacetic acid, ethylenediaminediacetic acid, ethylenediaminetriacetic acid, thioglycolic acid, thiomalic acid and phosphoric acid.

8. The metal chelate-forming fiber according to claim 5, wherein the metal chelate-forming compound consists of iminodiacetic acid, ethylenediaminetriacetic acid or thioglycolic acid.

9. The metal chelate-forming fiber according to claim 5, wherein the synthetic fiber comprises at least one compound selected from the group consisting of polyamide fiber, polyester fiber and polyurethane fiber.

10. The metal chelate-forming fiber according to claim 5, wherein the fiber is in the form of powder.

11. The metal chelate-forming fiber according to claim 5, wherein the fiber is a filter material.

12. A metal chelate fiber having a metal bonded by chelation to the metal chelate-forming fiber, wherein the metal chelate-forming fiber comprises:

a synthetic fiber selected from the group consisting of a polycondensation fiber or a polyaddition fiber, and at least one metal chelate-forming compound selected from an epoxy reactive group consisting of an aminocarboxylic acid, a thiocarboxylic acid and a phosphoric acid, bonded to the synthetic fiber via a crosslinkable compound, wherein the crosslinkable compound is grafted to the synthetic fiber by graft polymerizing a crosslinkable compound having a reactive double bond and a glycidyl group to the synthetic fiber in the presence of a redox catalyst.

13. A process for producing a metal chelate-forming fiber, comprising the steps of:

graft polymerizing a crosslinkable compound having a reactive double bond and a glycidyl group to a synthetic fiber selected from the group consisting of a polycondensation fiber or a polyaddition fiber, wherein said step of the graft polymerizing includes using a redox catalyst; and bonding a graft reaction product produced in said step of graft polymerizing to at least one metal chelate-forming compound selected from an epoxy reactive group consisting of an aminocarboxylic acid, a thiocarboxylic acid and a phosphoric acid.

14. The process according to claim 13, wherein the crosslinkable compound comprises a compound selected from the group consisting of glycidyl methacrylate, glycidyl acrylate and allyl glycidyl ether.

15. The process according to claim 13, wherein the metal chelate-forming compound comprises a compound selected from the group consisting of iminodiacetic acid, ethylenediaminediacetic acid, ethylenediaminetriacetic acid, thioglycolic acid, thiomalic acid and phosphoric acid.

16. The process according to claim 13, wherein the redox catalyst consists of a combination of a divalent copper salt and a persulfate salt or a combination of a divalent iron salt, hydrogen peroxide and thiourea dioxide.

17. The process according to claim 16, further comprising the steps of:

pre-treating the synthetic fiber with the persulfate salt and then applying the divalent copper salt to thereby perform said step of graft polymerizing.

18. The process according to claim 16, further comprises the steps of:

pre-treating the synthetic fiber with a divalent iron salt and then applying a hydrogen peroxide and thiourea dioxide to perform said step of graft polymerizing.

* * * * *